(12) United States Patent
Matsuzawa

(10) Patent No.: US 8,683,036 B2
(45) Date of Patent: Mar. 25, 2014

(54) DISTRIBUTION SERVER, DATA DISTRIBUTION METHOD, AND PROGRAM

(75) Inventor: Daisuke Matsuzawa, Tokyo (JP)

(73) Assignee: Sony Corporation (JP)

( * ) Notice: Subject to any disclaimer, the term of this patent is extended or adjusted under 35 U.S.C. 154(b) by 449 days.

(21) Appl. No.: 13/140,098

(22) PCT Filed: Nov. 27, 2009

(86) PCT No.: PCT/JP2009/070023
§ 371 (c)(1),
(2), (4) Date: Jun. 16, 2011

(87) PCT Pub. No.: WO2010/073874
PCT Pub. Date: Jul. 1, 2010

(65) Prior Publication Data
US 2011/0252133 A1  Oct. 13, 2011

(30) Foreign Application Priority Data

Dec. 26, 2008  (JP) ............................... P2008-334938

(51) Int. Cl.
*G06F 15/173*  (2006.01)
(52) U.S. Cl.
USPC ........................................ 709/224; 709/238
(58) Field of Classification Search
USPC ....................................................... 709/224
See application file for complete search history.

(56) References Cited

U.S. PATENT DOCUMENTS

| 6,728,212 | B1 | 4/2004 | Tancevski | |
| 7,054,949 | B2 * | 5/2006 | Jennings | 709/238 |
| 2002/0165697 | A1 * | 11/2002 | Min | 702/183 |

FOREIGN PATENT DOCUMENTS

| JP | 2002358534 A | 12/2002 |
| JP | 2003030076 A | 1/2003 |
| JP | 2003199060 A | 7/2003 |
| JP | 2003533306 T | 11/2003 |
| JP | 2007287041 A | 11/2007 |
| JP | 2008108142 A | 5/2008 |
| WO | 0188826 A1 | 11/2001 |
| WO | 2008126368 A1 | 10/2008 |

OTHER PUBLICATIONS

Office Action from Japanese Application No. 2008-334938, dated Jun. 4, 2013.
Office Action from Japanese Application No. 2008-334938, dated Mar. 26, 2013.
European Search Report EP 09834678, dated Nov. 9, 2012.

* cited by examiner

*Primary Examiner* — Asghar Bilgrami
(74) *Attorney, Agent, or Firm* — Lerner, David, Littenberg, Krumholz & Mentlik, LLP

(57) ABSTRACT

A distribution server includes an analysis unit for analyzing basic data used in statistics to generate statistical data, a control unit for receiving an acquisition request for the basic data and the statistical data from a communication terminal, a bandwidth monitoring unit for monitoring a bandwidth of a communication line connected to the communication terminal, a degree-of-multiplex calculation unit for calculating a degree of multiplex for simultaneously transmitting the basic data and the statistical data to the communication terminal via the communication line based on a data size of the basic data and the statistical data and an available bandwidth of the communication line, a separation unit for separating the basic data and the statistical data into prescribed units based on the degree of multiplex, and a transmission unit for transmitting the basic data and the statistical data separated into the prescribed units to the communication terminal.

6 Claims, 11 Drawing Sheets

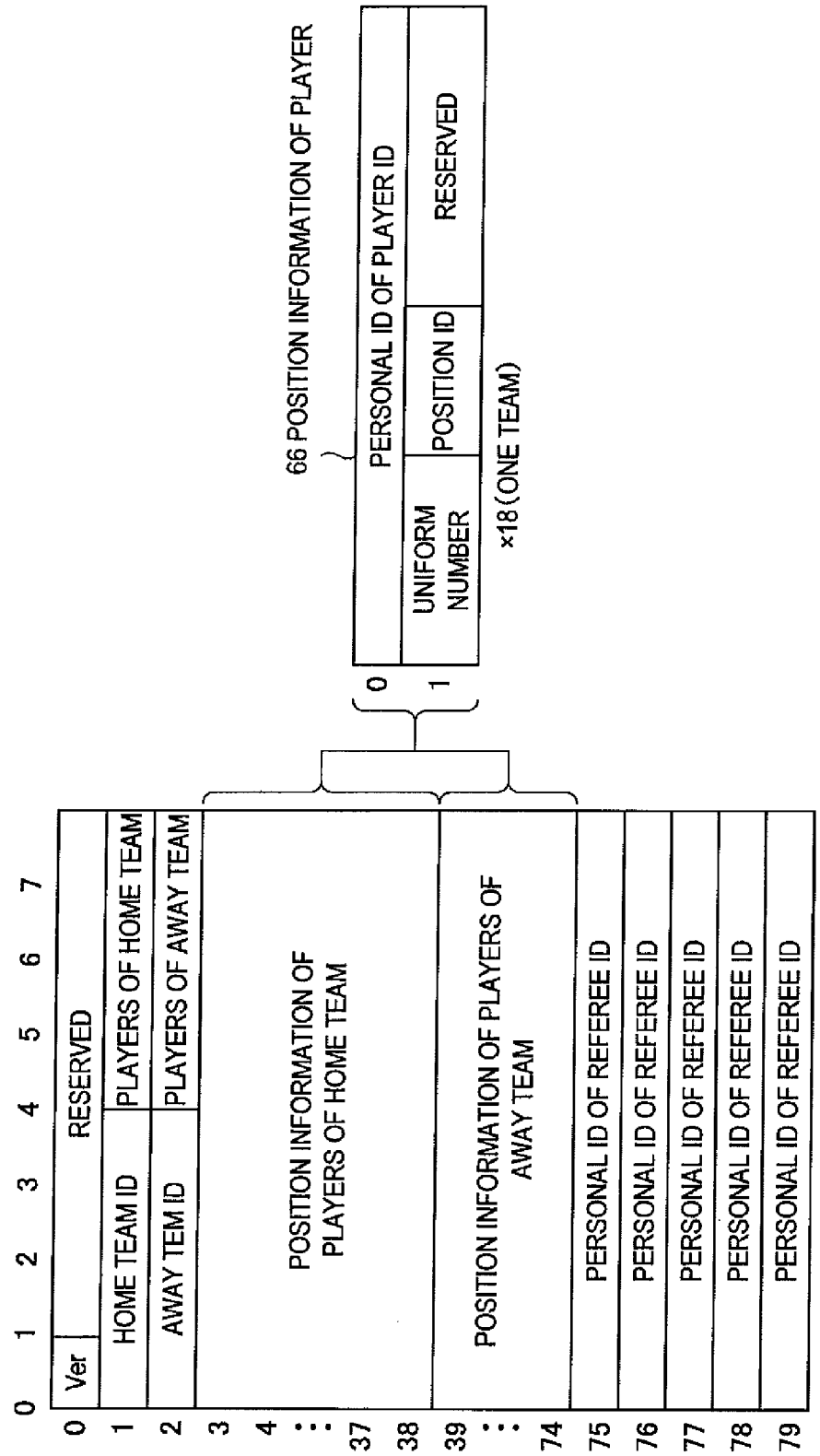

62 TRACKING FILE: TEAM (HOME/AWAY COMMON)

| | 0 | 1 | 2 | 3 | 4 | 5 | 6 | 7 | |
|---|---|---|---|---|---|---|---|---|---|
| 0 | | | | | UTC | | | | long |
| 1 | | | | | FRAME NUMBER | | | | long |
| 2 | | | | | FW FRONT EDGE | | | | double |
| 3 | | | | | FW BACKWARD EDGE | | | | double |
| 4 | | | | | MF FRONT EDGE | | | | double |
| 5 | | | | | MF BACKWARD EDGE | | | | double |
| 6 | | | | | DF FRONT EDGE | | | | double |
| 7 | | | | | DF BACKWARD EDGE | | | | double |
| 8 | | | | | RIGHT EDGE | | | | double |
| 9 | | | | | LEFT EDGE | | | | double |
| 10 | | | | | AVERAGE SPACE | | | | double |
| 11 | | | | | CURRENT AVERAGE SPEED | | | | double |
| 12 | | | | | CURRENT MAXIMUM SPEED | | | | double |
| 13 | | | | | CURRENT MINIMUM SPEED | | | | double |

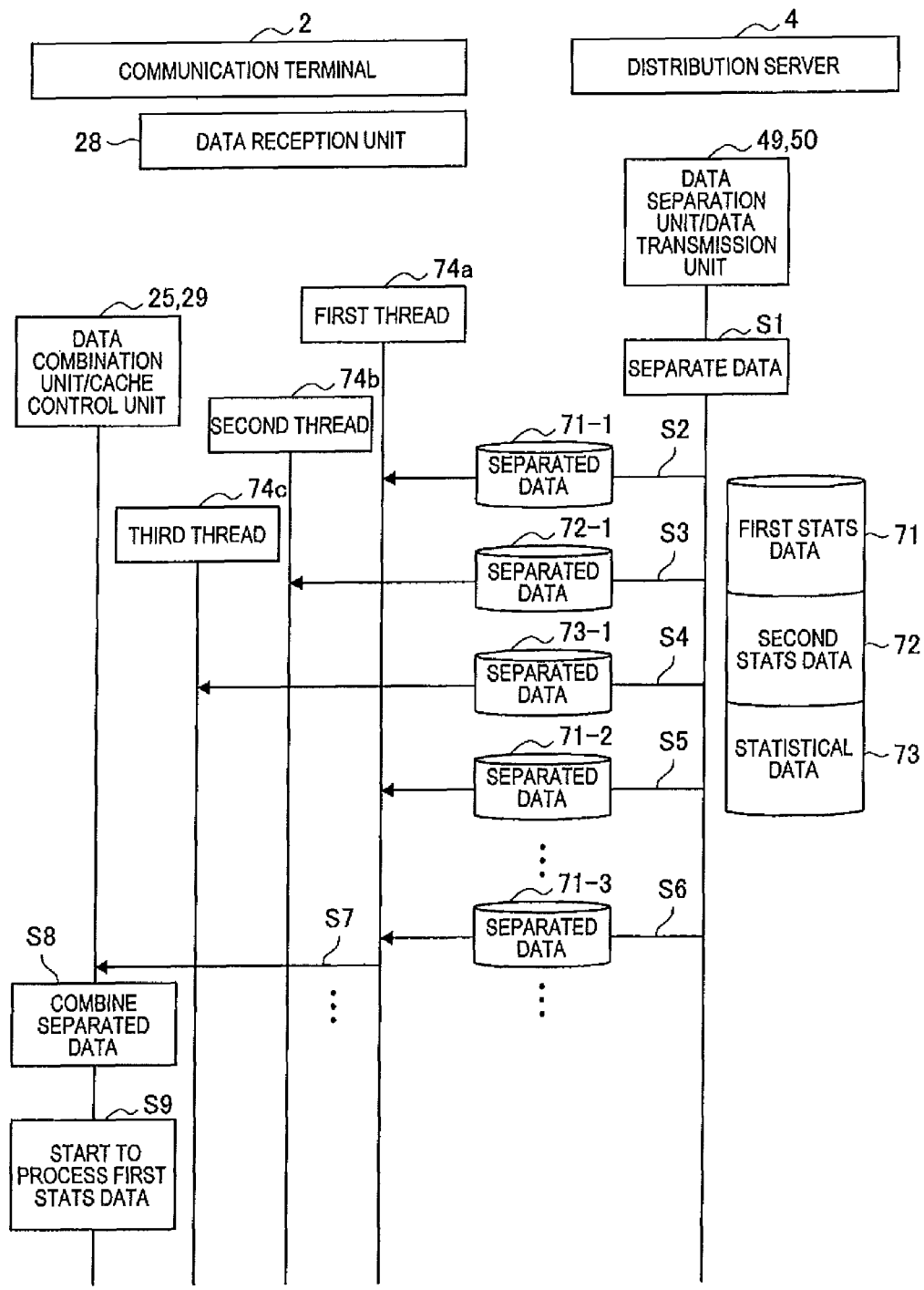

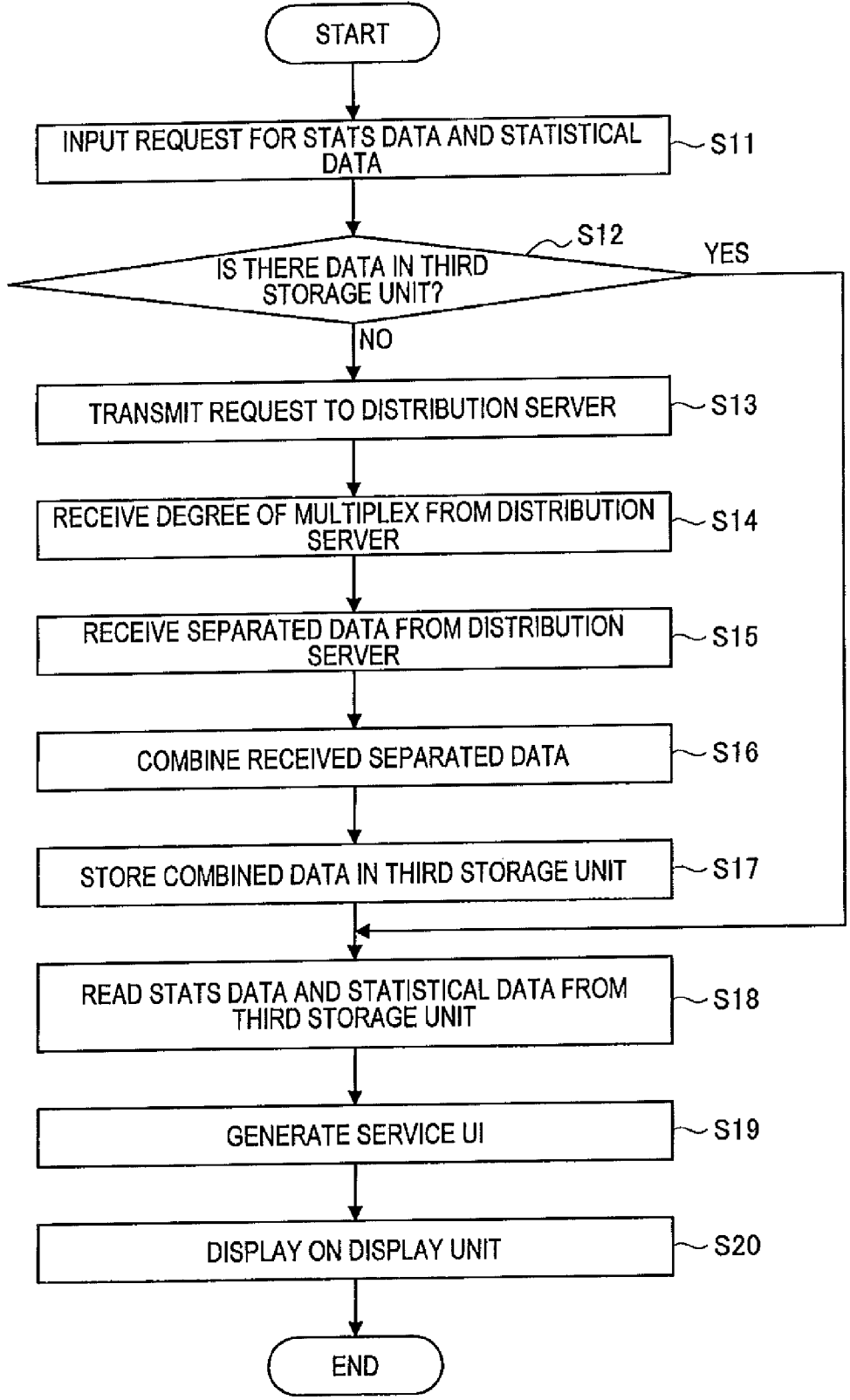

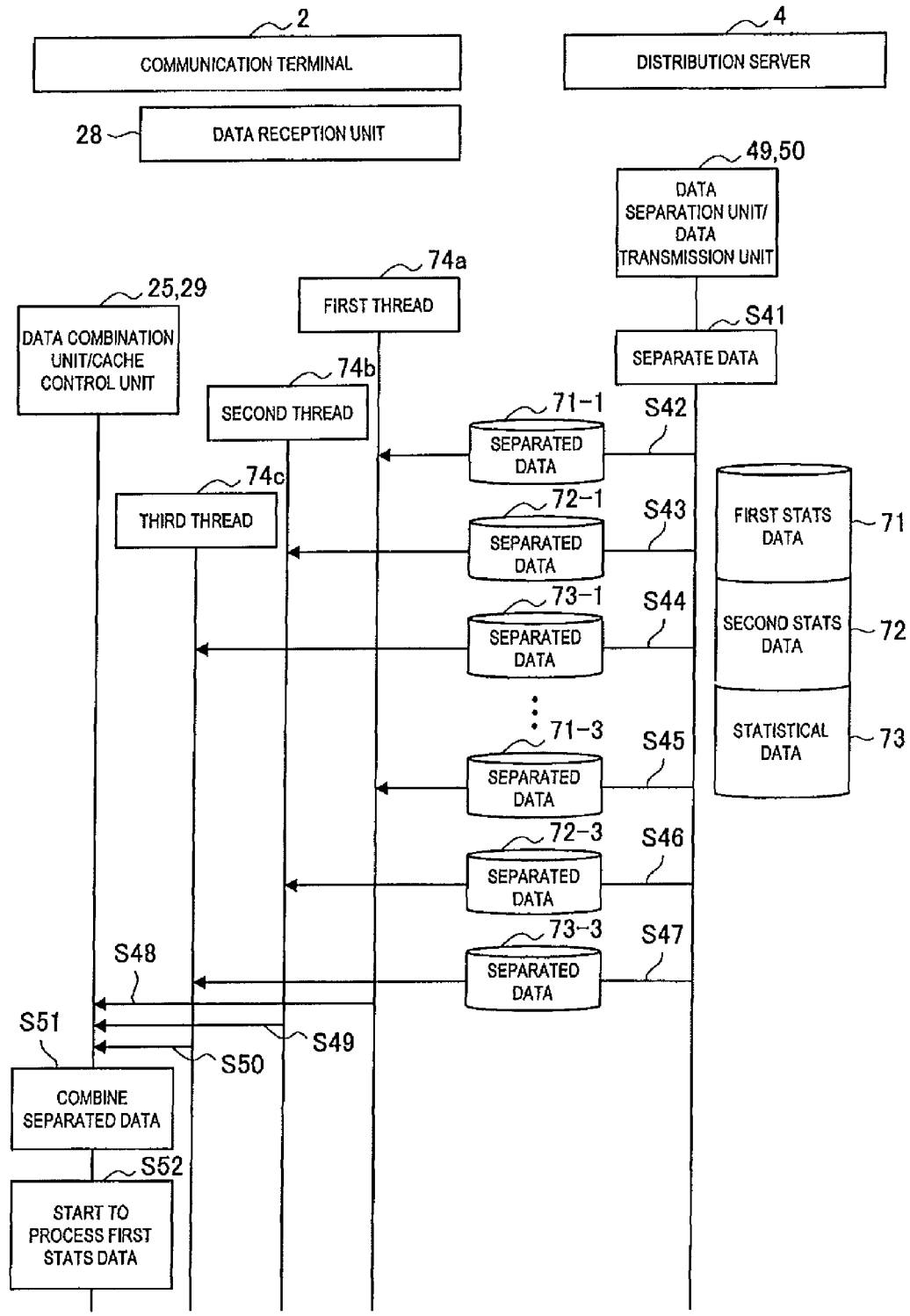

DISTRIBUTION SERVER, DATA DISTRIBUTION METHOD, AND PROGRAM

CROSS-REFERENCES TO RELATED APPLICATIONS

The present application is a national phase entry under 35 U.S.C. §371 of International Application No. PCT/JP2009/070023 filed Nov. 27, 2009, published on Jul. 1, 2010 as WO 2010/073874 A1, which claims priority from Japanese Patent Application No. JP 2008-334938 filed in the Japanese Patent Office on Dec. 26, 2008.

TECHNICAL FIELD

The present invention relates to a distribution server, a distribution method, and a program suitable for application when data obtained from a video, for example, in which a sports game is imaged, is distributed to a communication terminal.

BACKGROUND ART

In the related art, services are implemented to provide information of each play (a shot, a pass, or the like) of each player from a server to a communication terminal in a sports game such as a soccer game. The information of each play is included, for example, in basic data recorded according to a data format of STATS. The server converts the basic data in the form of extensible markup language (XML), and distributes the converted basic data to the communication terminal using a hypertext transfer protocol (HTTP).

Patent Literature 1 discloses technology in which a data distribution device adds CG data and transmits the added CG data to a terminal along with scenario data if there is a special scenario.

Patent Literature 2 discloses technology that matches a search condition with text data to which a search word is written and distributes files of video data, image data, and text data of a period including a scene corresponding to the search condition to a user.

CITATION LIST

Patent Literature

Patent Literature 1: Japanese Patent Application Laid-Open No. 2002-358534
Patent Literature 2: Japanese Patent Application Laid-Open No. 2003-199060

SUMMARY OF INVENTION

Technical Problem

Incidentally, the communication terminal receiving the basic data independently obtains statistical data by starting a dedicated application program and analyzing x and y coordinate data included in the basic data. However, if each communication terminal performs processing as described above, there is a disadvantage in that a processing load of the communication terminal increases.

The present invention is made in view of the above-mentioned issue, and aims to distribute basic data used in statistics and statistical data obtained by analyzing the basic data to be usable by a communication terminal.

Solution to Problem

In the present invention, statistical data is generated by analyzing basic data used in statistics, an acquisition request for the basic data and the statistical data is received from a communication terminal, and a bandwidth of a communication line connected to the communication terminal is monitored.

Next, a degree of multiplex for simultaneously transmitting the basic data and the statistical data to the communication terminal via the communication line is calculated on the basis of a data size of the basic data and the statistical data and an available bandwidth of the communication line.

The basic data and the statistical data are separated into prescribed units based on the degree of multiplex, and the basic data and the statistical data separated into the prescribed units are transmitted to the communication terminal.

Thereby, it is possible to multiplex statistical data pre-analyzed by a distribution server on the basis of basic data with the basic data and distribute the multiplexed data to a communication terminal making an acquisition request for the basic data and the statistical data.

Advantageous Effects of Invention

According to the present invention, a distribution server can distribute statistical data pre-analyzed on the basis of basic data to a communication terminal along with the basic data, so that it is unnecessary for the communication terminal to recreate the statistical data by analyzing the received basic data. Thus, there is an advantageous effect in that a processing load of the communication terminal is reduced.

BRIEF DESCRIPTION OF DRAWINGS

FIG. 3A is an illustrative diagram showing an example of a file format of a control file of STATS data according to the first embodiment of the present invention.

FIG. 4 is a sequence diagram showing an example of data distribution processing according to the first embodiment of the present invention.

FIG. 5 is a flowchart showing a processing example of a communication terminal according to the first embodiment of the present invention.

FIG. 7 is a sequence diagram showing an example of data distribution processing according to a second embodiment of the present invention.

REFERENCE SIGNS LIST

Figure 1:
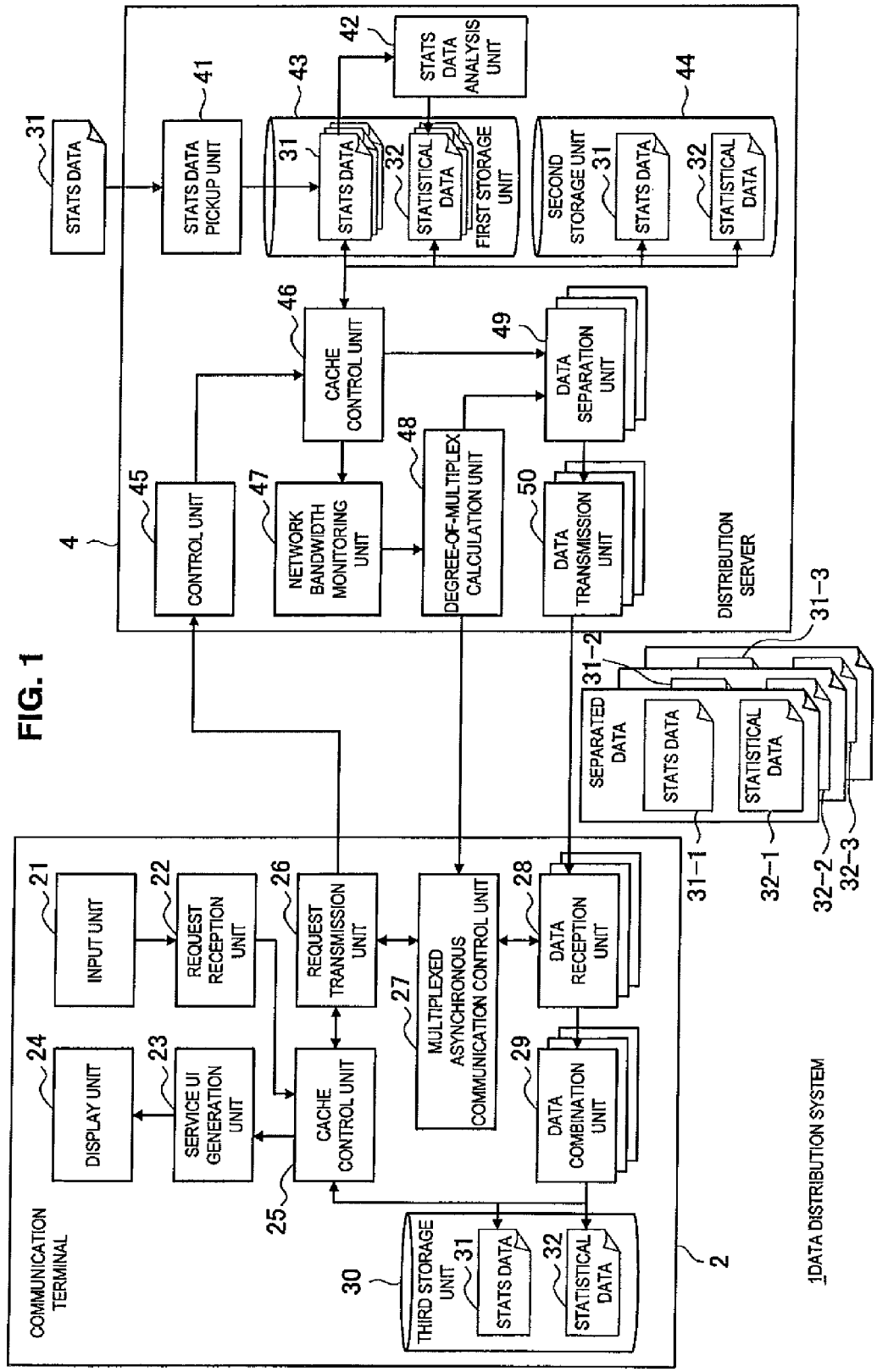
FIG. 1 is a block diagram showing an internal configuration example of a data distribution system according to a first embodiment of the present invention.

1: Data distribution system
2: Communication terminal
4: Distribution server
21: Input unit
22: Request reception unit
23: Service UI generation unit
24: Display unit
25: Cache control unit
26: Request transmission unit
27: Multiplexed asynchronous communication control unit
28: Data reception unit
29: Data combination unit
30: Third storage unit
41: STATS data pickup unit
42: STATS data analysis unit
43: First storage unit
44: Second storage unit
45: Control unit
46: Cache control unit
47: Network bandwidth monitoring unit
48: Degree-of-multiplex calculation unit
49: Data separation unit
50: Data transmission unit
51: Video
31a: Event data
31b: Position information data
61: Control file
62 to 65: Tracking file

DESCRIPTION OF EMBODIMENTS

Hereinafter, embodiments of the invention will be described. The description will be given in the following order.
1. First Embodiment (Distribution Control of Basic Data and Statistical Data)
2. Second Embodiment (Distribution Control of Basic Data and Statistical Data)
3. Modified Example 1. First Embodiment

[Example of Data Distribution System]

Hereinafter, the first embodiment of the present invention will be described with reference to FIGS. 1 to 6. In this embodiment, an example applied to a data distribution system 1, which distributes basic data formed on the basis of a format defining information of teams joining, for example, a soccer game, and position information of players and referees and statistical data obtained by analyzing the basic data, will be described.

FIG. 1 is a block diagram showing a configuration example of the data distribution system 1 of this example.

The data distribution system 1 has a communication terminal 2, which makes an acquisition request for basic data and statistical data, and a distribution server 4, which distributes the basic data and the statistical data for which the acquisition request has been received to the communication terminal 2. The communication terminal 2 and the distribution server 4 may be connected, for example, by the Internet, and communicate with each other, for example, using a simple object access protocol (SOAP).

The communication terminal 2 located at a client side has an input unit 21, which allows a user to input manipulation via a user interface (UI) displayed on a display unit 24, which displays a screen. The communication terminal 2 also has a request reception unit 22, which receives a request (acquisition request) generated by a manipulation input of the input unit 21. The communication terminal 2 also has a cache control unit 25, which searches whether or not requested data is stored in a third storage unit 30 to be described later as a cache. This request may be, for example, an acquisition request for a tracking file indicating a motion of a specific player during a match. The request reception unit 22 inputs processing corresponding to request content to the cache control unit 25.

The communication terminal 2 also has a service UI generation unit 23, which generates a screen using data acquired from the distribution server (or data stored in the third storage unit 30), and a display unit 24, which displays the screen generated by the service UI generation unit.

The communication terminal 2 also has the cache control unit 25, which controls an operation of writing data acquired from the distribution server 4 to the third storage unit 30 as the cache as a request result, and reads the requested data from the third storage unit 30. The communication terminal 2 also has a request transmission unit 26, which transmits the requested data to the distribution server 4 via the cache control unit 25. The request transmission unit 26 transmits data reception possibility to the distribution server 4 on the basis of information regarding a degree of multiplex and a session reported from the distribution server 4.

The cache control unit 25 receives an input from the request reception unit 22, and passes data acquired from the third storage unit 30 to the service UI generation unit 23 if there is data serving as a request target in the third storage unit 30. If there is no target data in the third storage unit 30, request content is delivered to the request transmission unit 26. Thereby, the request content input from the cache control unit 25 is transmitted to the distribution server 4.

The communication terminal 2 also has a data reception unit 28, which transmits a data acquisition request to a data transmission unit 50 of the distribution server 4 after the start by a multiplexed asynchronous communication control unit 27. The communication terminal 2 also has a data combination unit 29, which receives and combines separated data input from the data reception unit 28.

The data reception unit 28 acquires STATS data separated for transmission as a return value of the data acquisition request and delivers the separated data input from the data reception unit 28 to the data combination unit 29. The data combination unit 29 stores STATS data obtained by a combination in the third storage unit 30.

The communication terminal 2 also has the multiplexed asynchronous communication control unit 27, which starts the data reception unit 28 and the data combination unit 29 in multiple threads on the basis of a value of the degree of multiplex designated from the distribution server 4. Each thread operates independently, and the data reception unit 28 receives data separated into prescribed units from the distribution server 4. If data acquisition completion notification is received from the distribution server 4, the data combination unit 29 combines the separated data. The multiplexed asynchronous communication control unit 27 receives the data acquisition completion notification from the data reception unit 28. If data reception is completed in all of the threads, the multiplexed asynchronous communication control unit 27 notifies the request transmission unit 26 of the fact that the data reception is completed in all of the threads.

On the other hand, the distribution server 4 distributes only metadata, which is information attached to a moving image file, without distributing the moving image file itself. A media server (flash media server) (not shown) or the like distributes the moving image file.

The distribution server 4 has a STATS data pickup unit 41, which parses STATS data 31 described in a STATS format to be described later (semantic analysis), and writes the STATS data 31 to a first storage unit 43. When the STATS data 31 is picked up from an information processing device (not shown), the STATS data pickup unit 41 performs simple analysis for a movement speed of a player, a team holding a ball, etc., and assigns an analysis result to the picked-up STATS data 31.

The distribution server 4 has the first storage unit 43, which permanently stores the STATS data 31 and statistical data 32, and a second storage unit 44, which caches the STATS data 31 and the statistical data 32 read once from the first storage unit 43. The second storage unit 44 stores the STATS data 31 and the statistical data 32 for which an acquisition request from the communication terminal 2 has been made only within a prescribed period shorter than a period of storage by the first storage unit 43.

The distribution server 4 also has a STATS data analysis unit 42, which reads the STATS data and other data stored in the first storage unit 43, and executes analysis processing. The STATS data analysis unit 42 obtains statistical data such as, for example, the number of shots of each team, the number of goals, a right-foot shot probability, a left-foot shot probability, and the like, as results of analysis processing of the STATS data 31. The STATS data analysis unit 42 writes the statistical data 32 obtained by the analysis to the first storage unit 43.

The distribution server 4 also has a control unit 45, which receives a request for the STATS data 31 and the statistical data 32 from the communication terminal 2, and a cache control unit 46, which checks the presence/absence of a cache according to content of an acquisition request input from the control unit 45. The control unit 45 delivers the request content to the cache control unit 46, if necessary.

The distribution server 4 also has a network bandwidth monitoring unit 47, which monitors a network bandwidth of a client requested, a maximum transmission unit (MTU), and the like. The distribution server 4 also has a degree-of-multiplex calculation unit 48, which calculates a degree of multiplex when data requested by the communication terminal 2 is distributed.

The cache control unit 46 reads the STATS data 31 and the statistical data 32 for which an acquisition request from the communication terminal 2 has been made from the first storage unit 43, and also stores the STATS data 31 and the statistical data 32 in the second storage unit 44 as the cache. If the acquisition request for the STATS data 31 and the statistical data 32 from the communication terminal 2 has been made again within a prescribed period, the cache control unit 46 also provides a data separation unit 49 with the STATS data 31 and the statistical data 32 read from the second storage unit 44. The cache control unit 46 also delivers a data service of the STATS data 31 and the statistical data 32 for which the request has been received to the network bandwidth monitoring unit 47, which monitors a network bandwidth of a communication line connected to the communication terminal 2.

When the communication terminal 2 first accesses the distribution server 4, the network bandwidth monitoring unit 47 causes the communication terminal 2 to download a file of several MBs arranged in the distribution server 4. The communication terminal 2 notifies the distribution server 4 of information indicating how many seconds have elapsed until the download is completed, so that the network bandwidth monitoring unit 47 can compute traffic of a network bandwidth.

After the data reception unit 28 receives the STATS data 31 and the statistical data 32, the network bandwidth monitoring unit 47 may monitor a bandwidth on the basis of a time until a request for acquiring the next STATS data 31 and statistical data 32 is reported to the distribution server 4. For example, the "time until the request is reported" is a time from an acquisition request for separated data 71-1 (see FIG. 4) to be described later to an acquisition request for separated data 71-2.

The network bandwidth monitoring unit 47 notifies the degree-of-multiplex calculation unit 48 of the monitored bandwidth along with a data size acquired from the cache control unit 46.

The degree-of-multiplex calculation unit 48 calculates a degree of multiplex for simultaneously transmitting basic data and statistical data to the communication terminal via the communication line on the basis of a data size of the basic data and the statistical data and an available bandwidth of the communication line. For example, the degree-of-multiplex calculation unit 48 decides the "degree of multiplex" considering separation into meaningful units by content of a request acquired from the network bandwidth monitoring unit 47, the data size, and the like.

The "meaningful unit" is a unit obtained by separating a tracking file (teams), a tracking file (players), and a tracking file (referees) to be described later, and the like or also separation event data or statistical data for each team and each player. These files are data included in the basic data, and the degree-of-multiplex calculation unit 48 calculates a degree of multiplex on the basis of event data included in basic data, information of teams defined on the basis of a format, and position information of players or referees. For example, the "meaningful unit" is a match, a team, a person, a time range (for example, an interval of 10 minutes) of a coordinated universal time (UTC), or the like. The degree-of-multiplex calculation unit 48 notifies the multiplexed asynchronous communication control unit 27 of the communication terminal 2 of the decided degree of multiplex, and notifies the data separation unit 49 of information of the degree of multiplex, the MTU, and the like.

The data separation unit 49 separates data into prescribed units for transmission on the basis of a data acquisition request received from the data transmission unit 50 and information of the degree of multiplex or the like (the MTU or the like) received from the degree-of-multiplex calculation unit 48, and delivers the separated data to the data transmission unit 50.

The data transmission unit 50 receives a request from the data reception unit 28 of the communication terminal 2, and requests the data separation unit 49 to acquire transmission data. The data transmission unit 50 also transmits basic data and statistical data separated into the prescribed units received from the data separation unit 49 to the communication terminal 2.

In this example, the degree-of-multiplex calculation unit 48 calculates an appropriate value considering a data size of a file to be distributed to the communication terminal 2 and the number of sessions as the "degree of multiplex." For example, if three players A, B, and C are designated when there is a request for acquiring position information of any player, the degree of multiplex is simply designated as 3. However, there is data of position information and the like, for example, regarding 22 players as starting members of a soccer game, in data of one match of the players of two teams. In this case, it is difficult to manage sessions since the number of sessions is large if the number of persons is simply designated as the degree of multiplex as described above. Thus, the distribution server 4 predefines a maximum value of the degree of multiplex for one request received from the communication terminal 2.

For example, the distribution server 4 performs processing of separation data so that the degree of multiplex does not exceed the maximum value. Here, a change may be made so that data to be separated for each player is separated into team units. However, if the data is arranged in the team units, a size of data to be transmitted to the communication terminal 2 may increase in one session. In this case, the data separated into the team units is further separated into a meaningful unit of a first half or a second half of a game. If the data is separated as described above, the degree-of-multiplex calculation unit 48 calculates a degree of multiplex, 4, and notifies the multiplexed asynchronous communication control unit 27 and the data separation unit 49 of the degree of multiplex. Thereby, it is possible to dynamically change the degree of multiplex by considering a network bandwidth as well as a data size. A threshold of a size of data to be transmitted in one session may also be preset in the distribution server 4.

Figure 2:
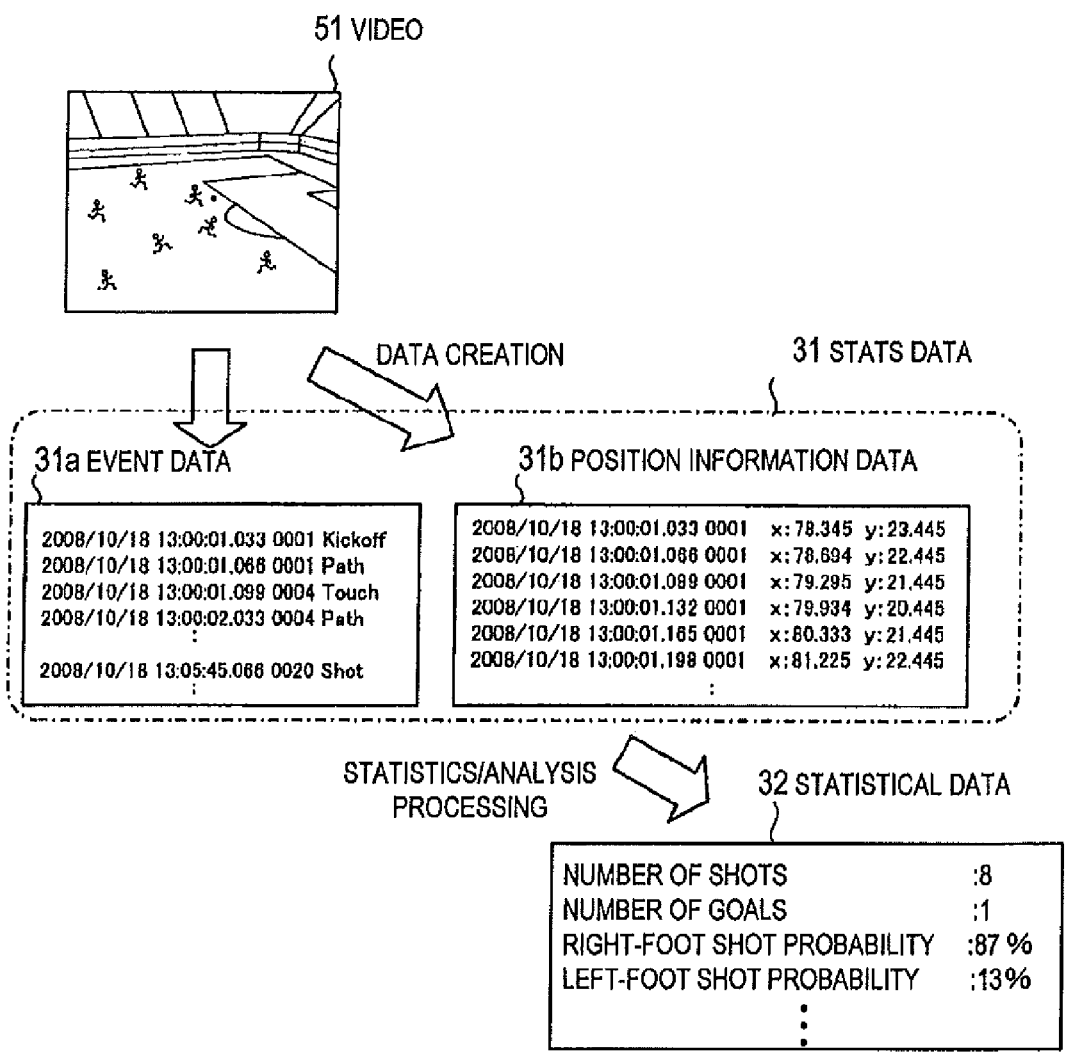
FIG. 2 is an illustrative diagram showing an example of event data, position information data, and statistical data according to the first embodiment of the present invention.
Figure 3B:
FIG. 3B is an illustrative diagram showing an example of a file format of a tracking file of STATS data according to the first embodiment of the present invention.
Figure 3C:
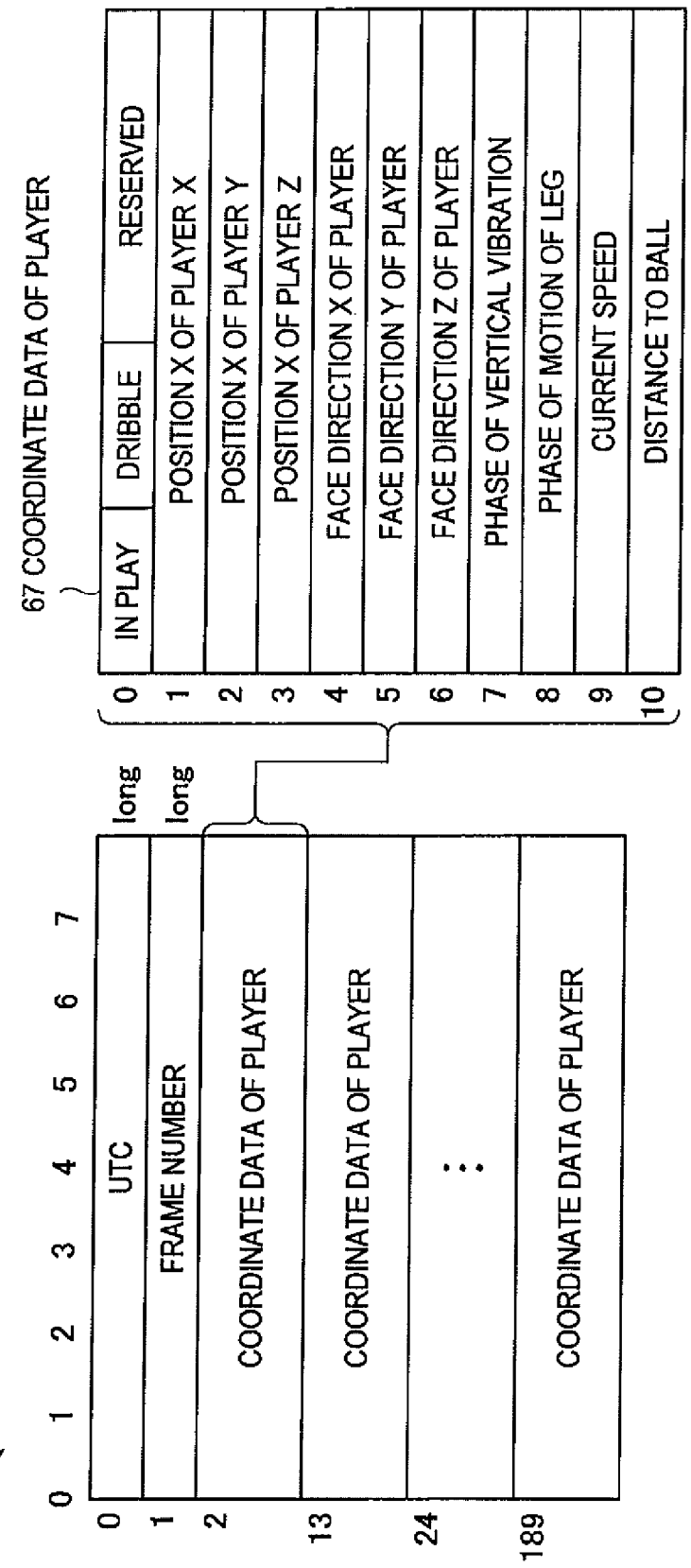
FIG. 3C is an illustrative diagram showing an example of a file format of a tracking file of STATS data according to the first embodiment of the present invention.
Figure 3D:
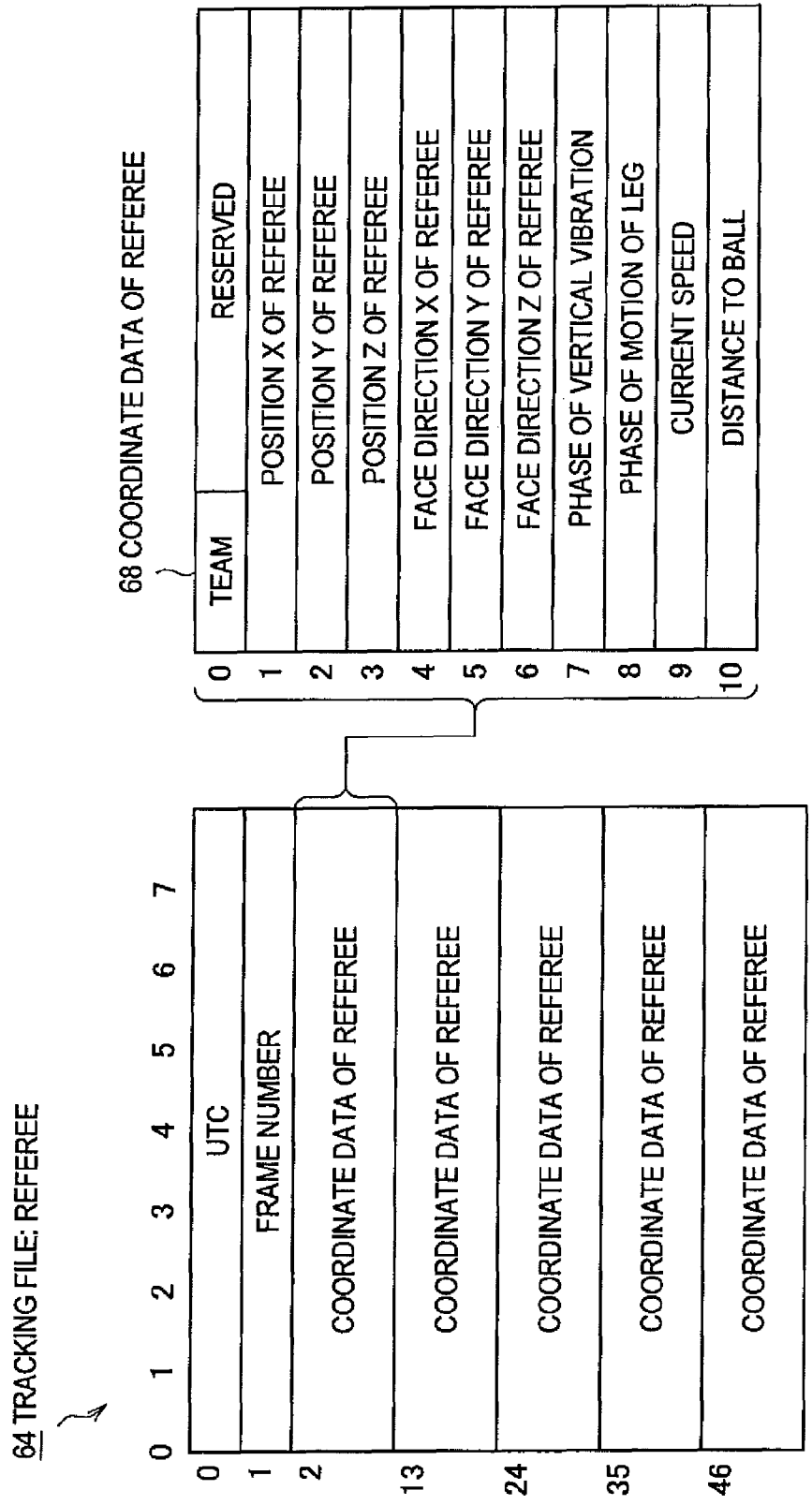
FIG. 3D is an illustrative diagram showing an example of a file format of a tracking file of STATS data according to the first embodiment of the present invention.
Figure 3E:
FIG. 3E is an illustrative diagram showing an example of a file format of a tracking file of STATS data according to the first embodiment of the present invention.

FIG. 2 shows an example of video data, STATS data 31, and statistical data 32.

In this example, the STATS data 31 and the statistical data 32 will be described with reference to an example of a video 51 in which a soccer game among various sports games is displayed. In the video 51, players, referees, a ball, and the like moving in various directions on a field defined by a touch line and a goal line are displayed.

In the related art, information of a kick-off, a pass, a touch, and the like generated during the soccer game is recorded as event data 31*a* along with a time lapse. Position information data 31*b* indicating where players, referees and a ball move within the field at which point in time is recorded. The STATS data 31 including the event data 31*a* and the position information data 31*b* is used as "basic data" used in statistics/analysis. The statistical data 32 is obtained by performing statistical processing or analysis processing for the STATS data 31.

FIG. 3 shows an example of a file format (STATS format) defining STATS data. In the related art, there is no framework for effectively distributing the STATS data via the Internet and no data format for distributing the STATS data. For example, it is possible to create basic data serving as a source of statistics for each match of a soccer game using a file format of the STATS data shown in this example and transmit the basic data to the communication terminal 2.

The STATS data 31 of each match is configured by a control file 61 and tracking files 62 to 65 having 8-byte records. A UTC and a frame number are attached to the tracking files 62 to 65, and the tracking files 62 to 65 are generated for each prescribed time or frame.

Information of players of a home team and an away team, position information of each player, and information of referees are recorded on the control file 61 used to specify a match or team and manage a UTC. The position information of each player is identified by a record 66 defining a uniform number, an ID of each position, or the like.

For example, information of a front edge and a backward edge of a forward (FW), and the like is recorded for each team on the tracking file 62 used in pre-analysis of the home team and the away team.

For example, coordinate data of each player in a field is recorded on the tracking file 63 used to track and pre-analyze the players of the home team and the away team as common information in the home team and the away team. The coordinate data of each player is identified by a record 67 defining information of x (a touch line direction), y (a goal line direction), and z (a height direction) of the player on the field, information of x, y, and z indicating a face direction of the player, and the like.

For example, coordinate data in a field of each referee is recorded on the tracking file 64 used to track the referees. The coordinate data of each referee is identified by a record 68 defining information of x (a touch line direction), y (a goal line direction), and z (a height direction) of the referee on the field, information of x, y, and z indicating a face direction of the referee, and the like.

For example, coordinate data of the ball on the field is recorded on the tracking file 65 used to track the ball.

In this example, the distribution server 4 reduces a processing load of the communication terminal 2 by distributing the statistical data 32 to the communication terminal 2 in addition to the control file 61 and the tracking files 62 to 65 (the STATS data 31).

[Example of Data Distribution Processing]

Hereinafter, a processing example in which the communication terminal 2 receives the STATS data 31 and the statistical data 32 from the distribution server 4 will be described.

FIG. 4 is a sequence diagram showing an example of distribution processing of the STATS data 31 and the statistical data 32.

First, the distribution server 4 dynamically decides a data size of the STATS data 31 and the statistical data 32 to be distributed at once in consideration of a data size of a total of files to be distributed, a network bandwidth, an MTU, and the like. At this time, the distribution server 4 separates STATS data into meaningful units, and decides a degree of multiplex of a TCP session.

Next, the distribution server 4 separates first STATS data 71, second STATS data 72, and statistical data 73 into three (step S1), and respectively creates separated data 71-1 to 71-3, 72-1 to 72-3, and 73-1 to 73-3. In this example, the distribution server 4 separates the data into three, but can arbitrarily change a unit of separation.

Next, the separated data is sequentially distributed to a first thread 74*a* to a third thread 74*c*. The first thread 74*a* to the third thread 74*c* are threads to be started by the data reception unit 28, and separated data to be received for each thread is decided. If all corresponding separated data is completely received, the first thread 74*a* to the third thread 74*c* disappear.

The distribution server 4 distributes the separated data 71-1 to the first thread 74*a* (step S2), distributes the separated data 72-1 to the second thread 74*b* (step S3), and distributes the separated data 73-1 to the third thread 74*c* (step S4).

Likewise, the distribution server 4 distributes the separated data 71-2 to the first thread 74*a* (step S5). Thereafter, likewise, the distribution server 4 distributes the separated data 72-2 to the second thread 74*b*, and distributes the separated data 73-2 to the third thread 74*c*.

Next, the distribution server 4 distributes the separated data 71-3 to the first thread 74*a* (step S6). Thereafter, likewise, the distribution server 4 distributes the separated data 72-3 to the second thread 74-*b*, and distributes the separated data 73-3 to the third thread 74*c*.

Incidentally, in processing of step S6, the distribution server 4 transmits information indicating that the distribution of all of the separated data (the separated data 71-1 to 71-3) of the first STATS data 71 has been completed to the communication terminal 2. If all of the separated data 71-1 to 71-3 is received, the first thread 74a notifies the data combination unit 29 of the information.

Next, the data combination unit 29 recovers the first STATS data 71 by combining the separated data 71-1 to 71-3 (step S8), and stores the first STATS data 71 in the third storage unit 30.

Next, the cache control unit 25 starts processing of providing the service UI generation unit 23 with the first STATS data 71 recovered by the data combination unit 29 (step S9).

As described above, it is possible to use a TCP session in a multiplexing mode by separating and distributing data, and maximally use a bandwidth of the Internet. That is, it is possible to first process the previously received first STATS data 71 even while separated data of the second STATS data 72 and the statistical data 73 is distributed. It is possible to shorten a waiting time of data acquisition by passing processing to a client at a point in time when the distribution of data separated into meaningful units has been completed.

FIG. 5 shows a processing example of the communication terminal 2.

First, the input unit 21 receives a request input for the STATS data 31 and the statistical data 32 from the user (step S11). Next, the cache control unit 25 searches the third storage unit 30, and determines the presence/absence of the requested STATS data 31 and statistical data 32 (step S12). If the requested STATS data 31 and statistical data 32 are temporarily stored in the third storage unit 30, the cache control unit 25 moves the processing to step S18.

On the other hand, if the requested STATS data 31 and statistical data 32 are not temporarily stored in the third storage unit 30, the cache control unit 25 transmits the request to the request transmission unit 26. The request transmission unit 26 transmits a request for the STATS data 31 and the statistical data 32 to the control unit 45 of the distribution server 4 (step S13).

Next, the multiplexed asynchronous communication control unit 27 receives a degree of multiplex from the degree-of-multiplex calculation unit 48 of the distribution server 4 (step S14). The data reception unit 28 receives the STATS data 31 and the statistical data 32 separated into prescribed units from the data transmission unit 50 of the distribution server 4 (step S15).

If the data reception unit 28 receives all of the separated STATS data 31 and statistical data 32, the data combination unit 29 combines the separated STATS data 31 and statistical data 32 (step S16). The data combination unit 29 stores the combined STATS data 31 and statistical data 32 in the third storage unit 30 (step S17).

Next, the cache control unit 25 reads the STATS data 31 and the statistical data 32 from the third storage unit 30 (step S18), and transmits the STATS data 31 and the statistical data 32 to the service UI generation unit 23. The service UI generation unit 23 generates a service UI on the basis of the STATS data 31 and the statistical data 32 received from the cache control unit 25, and transmits the service UI to the display unit 24 (step S19). The display unit 24 displays the service UI on a screen (step S20).

Figure 6:
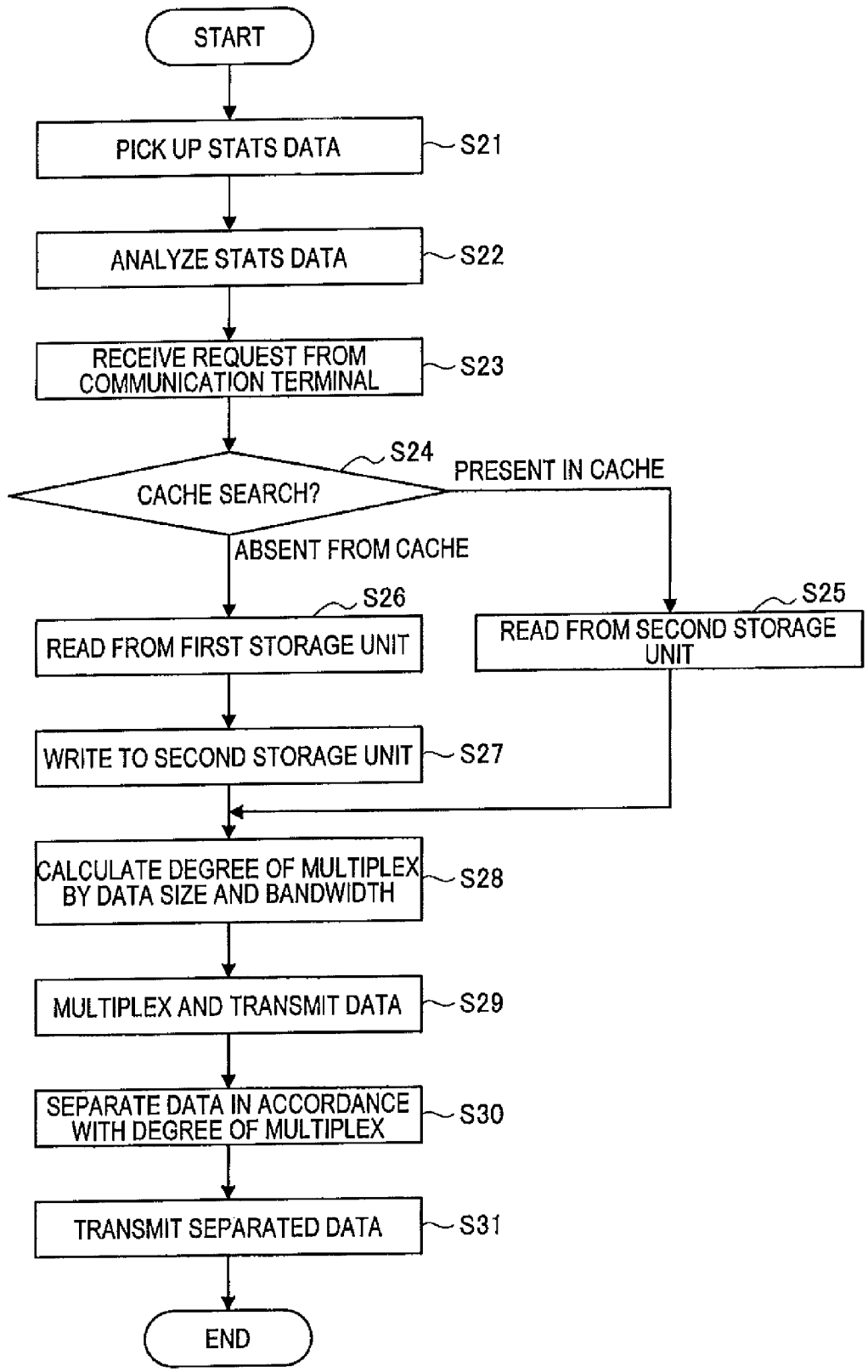
FIG. 6 is a flowchart showing a processing example of a distribution server according to the first embodiment of the present invention.

FIG. 6 shows a processing example of the distribution server 4.

First, the STATS data pickup unit 41 stores STATS data in the first storage unit 43 by picking up the STATS data 31 input from an information processing device (not shown) (step S21).

Next, the STATS data analysis unit 42 reads and analyzes the STATS data 31 from the first storage unit 43, generates the statistical data 32 (step S23), and stores the STATS data 31 and the statistical data 32 in the first storage unit 43.

Next, the control unit 45 receives a request from the communication terminal 2 (step S23). The cache control unit 46 searches whether the requested STATS data 31 and statistical data 32 are present in the cache (step S24). If it is determined that the requested STATS data 31 and statistical data 32 are present in the cache, the cache control unit 46 reads the requested STATS data 31 and statistical data 32 from the second storage unit 44 (step S25).

On the other hand, if it is determined that the requested STATS data 31 and statistical data 32 are absent from the cache, the cache control unit 46 reads the requested STATS data 31 and statistical data 32 from the first storage unit 43 (step S26). The STATS data 31 and the statistical data 32 read from the first storage unit 43 are written to the second storage unit 44 (step S27).

Next, the degree-of-multiplex calculation unit 48 calculates a degree of multiplex of the STATS data 31 and the statistical data 32 on the basis of a data size of the STATS data 31 and the statistical data 32 distributed to the communication terminal 2 and a monitoring result of the network bandwidth monitoring unit 47 (step S28). At this time, the degree-of-multiplex calculation unit 48 notifies the multiplexed asynchronous communication control unit 27 of the communication terminal 2 of the calculated degree of multiplex.

Next, the data separation unit 49 separates the STATS data 31 and the statistical data 32 according to the calculated degree of multiplex (step S30). The data transmission unit 50 distributes the separated STATS data 31 and statistical data 32 to the communication terminal 2 (step S31).

As described above, the distribution server 4 can distribute the STATS data 31 and the statistical data 32 having a large data size to the communication terminal 2 after separating and multiplexing the STATS data 31 and the statistical data 32. However, master data having a small data size or the like is directly distributed to the communication terminal 2 without being separated.

In the data distribution system 1 according to the above-described first embodiment, the STATS data 31 created on the basis of an actually captured video and the statistical data 32 obtained by quantizing/statistically analyzing the STATS data 31 can be distributed to the communication terminal 2 by the Internet or the like. At this time, it is possible to separate the STATS data 31 and the statistical data 32 in response to a network bandwidth, a file data size, and the like, and distribute a session to the communication terminal 2 by multiplexing the session. Thus, there is an advantageous effect in that the STATS data 31 and the statistical data 32 can be distributed by effectively utilizing the network bandwidth of the communication line to a maximum extent.

The STATS data 31 and the statistical data 32 are distributed to the communication terminal 2 in the STATS format shown in FIG. 3. As described above, a file format for distributing the STATS data 31 and the statistical data 32 is defined, so that the communication terminal 2 can use the statistical data 32 pre-created by the distribution server 4. As a result, there is an advantageous effect in that it is unnecessary for the communication terminal 2 to analyze the statistical data 32 from the STATS data 31 by its own device, and it is possible to reduce a processing load of the communication terminal 2.

2. Second Embodiment

Next, the second embodiment of the present invention will be described with reference to FIG. 7.

In this embodiment, an example applied to the data distribution system 1 having the communication terminal 2 and the distribution server 4 will also be described. In the following description, the same reference numerals are assigned to parts corresponding to FIGS. 1 and 4 described above in the first embodiment, and their detailed description is omitted.

[Example of Data Distribution Processing]

Hereinafter, a processing example in which the communication terminal 2 receives STATS data 31 and statistical data 32 from the distribution server 4 will be described.

FIG. 7 is a sequence diagram showing an example of the data distribution processing.

First, the distribution server 4 dynamically decides a size of data to be distributed at once in consideration of a data size of a total of files to be distributed, a network bandwidth, an MTU, and the like.

Next, the distribution server 4 separates first STATS data 71, second STATS data 72, and statistical data 73 into three (step S41), and respectively creates separated data 71-1 to 71-3, 72-1 to 72-3, and 73-1 to 73-3.

Next, the separated data is sequentially distributed to a first thread 74a to a third thread 74c.

The distribution server 4 distributes the separated data 71-1 to the first thread 74a (step S42), and distributes the separated data 72-1 to the second thread 74b (step S43). The distribution server 4 distributes the separated data 73-1 to the third thread 74c (step S44).

Thereafter, likewise, the distribution server 4 distributes the separated data 72-1 to the first thread 74a, distributes the separated data 72-2 to the second thread 74b, and distributes the separated data 73-2 to the third thread 74c.

Next, the distribution server 4 distributes the separated data 71-3 to the first thread 74a (step S45). Thereafter, likewise, the distribution server 4 distributes the separated data 72-3 to the second thread 74b (step S46), and distributes the separated data 73-3 to the third thread 74c (step S47).

In this example, the distribution server 4 also notifies the first thread 74a to the third thread 74c of information indicating that the distribution of all separated data has been completed in the processing of each of steps S45, S46, and S47. The first thread 74a transmits the received separated data 71-1 to 71-3 to the data combination unit 29.

In this example, the data combination unit 29 waits to combine data until the reception of separated data of all data (the first STATS data 71, the second STATS data 72, and the statistical data 73) is completed. Thus, the second thread 74b transmits the received separated data 72-1 to 72-3 to the data combination unit 29 (step S48). The third thread 74c transmits the received separated data 73-1 to 73-3 to the data combination unit 29 (step S49).

Next, the data combination unit 29 combines the separated data 71-1 to 71-3, 72-1 to 72-3, and 73-1 to 73-3 (step S51), and recovers the first STATS data 71, the second STATS data 72, and the statistical data 73. The data combination unit 29 stores the first STATS data 71, the second STATS data 72, and the statistical data 73 in the third storage unit 30.

Next, the cache control unit 25 starts processing of providing the service UI generation unit 23 with the first STATS data 71, the second STATS data 72, and the statistical data 73 recovered by the data combination unit 29, or the like (step S52).

In the data distribution system 1 according to the above-described second embodiment, the communication terminal 2 waits to start processing until all threads receive all of the separated STATS data 31 and statistical data 32. Thus, there is an advantageous effect in that a network resource is maximally used by separating data and receiving the data in a multiplexed asynchronous mode, and data reception processing can be performed at a higher speed than that of acquisition in one session. The processing according to this embodiment is used when an application operates so that the communication terminal 2 does not start the processing if all threads do not acquire all data. For example, in this application, a motion of each player is displayed on a screen on the basis of position information of the players of the home team and the away team. When this application is operated, display is meaningless since motions of the players of the away team are not reflected even when only motions of the players of the home team are displayed on the screen by previously completing the reception of position information of the players of the home team. Thus, it is possible to simultaneously display the motions of the players of the home team and the away team on the screen by starting the processing after the position information of the players of the home team and the away team is received in all threads.

3. Modified Example

In the data distribution system 1 according to the above-described first and second embodiments, a point in time when the STATS data 31 is obtained is not limited. Thus, the STATS data 31 and the statistical data 32 may be distributed by delaying the data by about several hours from when a game has been actually performed. However, it is preferable that a result of a game performed in a separate site also be known to another site in real time. In this case, it is preferable for the distribution server 4 to process the received STATS data 31 in real time and create the statistical data 32 to transmit the statistical data 32 to the communication terminal 2. Thereby, there is an advantageous effect in that the distribution server 4 can distribute match situations of a plurality of sites to the communication terminal 2 in real time, and a rapid data communication property is improved.

A recording medium recording software program codes to implement the functions of the above-described first and second embodiments may be provided to a system or device. Of course, the functions may also be implemented when a computer of the system or device (or a control device such as a CPU) reads and executes the program codes stored in the recording medium.

In this case, for example, a floppy (registered trademark) disk, a hard disk, an optical disc, a magneto-optical disc, a CD-ROM, a CD-R, a magnetic tape, a nonvolatile memory card, a ROM, and the like can be used as the recording medium for providing the program codes.

The functions of the above-described embodiments are implemented by executing the program codes read by the computer. In addition, an OS operating on a computer or the like may partially or entirely execute actual processing based on an instruction of the program codes. The case where the functions of the above-described embodiments are implemented by its processing is also included.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

The invention claimed is:

1. A distribution server device comprising:
an analysis unit generating statistical data by analyzing basic data used in statistics; a control unit receiving an acquisition request for the basic data and the statistical data from a communication terminal; a bandwidth monitoring unit monitoring a bandwidth of a communication line connected to the communication terminal; a degree-of-multiplex calculation unit calculating a degree of multiplex for simultaneously transmitting the basic data and the statistical data to the communication terminal via the communication line on the basis of a data size of the basic data and the statistical data and an available bandwidth of the communication line; a separation unit separating the basic data and the statistical data into prescribed units based on the degree of multiplex; and a transmission unit transmitting the basic data and the statistical data separated into the prescribed units to the communication terminal.

2. The distribution server device according to claim 1, comprising: a first storage unit storing the basic data and the statistical data; a second storage unit storing the basic data and the statistical data for which the acquisition request from the communication terminal has been made only within a prescribed period shorter than a period of storage of the first storage unit; and a cache control unit reading the basic data and the statistical data for which the acquisition request from the communication terminal has been made, storing the read data in the second storage unit as a cache, and providing the separation unit with the basic data and the statistical data read from the second storage unit if the acquisition request for the basic data and the statistical data from the communication terminal has been made again within the prescribed period.

3. The distribution server device according to claim 2, wherein the basic data is formed on the basis of a format defining information of teams joining a sports game and position information of players and referees.

4. The distribution server device according to claim 3, wherein the degree-of-multiplex calculation unit calculates the degree of multiplex on the basis of event data included in the basic data, information of the teams defined on the basis of the format, and the position information of the players or the referees.

5. A distribution method comprising the steps of:
generating statistical data by analyzing basic data used in statistics;
receiving an acquisition request for the basic data and the statistical data from a communication terminal;
monitoring a bandwidth of a communication line connected to the communication terminal;
calculating a degree of multiplex for simultaneously transmitting the basic data and the statistical data to the communication terminal via the communication line on the basis of a data size of the basic data and the statistical data and an available bandwidth of the communication line;
separating the basic data and the statistical data into prescribed units based on the degree of multiplex; and
transmitting the basic data and the statistical data separated into the prescribed units to the communication terminal.

6. A non-transitory computer readable medium having stored thereon a program for causing a computer to execute the steps of: generating statistical data by analyzing basic data used in statistics; receiving an acquisition request for the basic data and the statistical data from a communication terminal; monitoring a bandwidth of a communication line connected to the communication terminal; calculating a degree of multiplex for simultaneously transmitting the basic data and the statistical data to the communication terminal via the communication line on the basis of a data size of the basic data and the statistical data and an available bandwidth of the communication line; separating the basic data and the statistical data into prescribed units based on the degree of multiplex; and transmitting the basic data and the statistical data separated into the prescribed units to the communication terminal.

* * * * *